Aug. 7, 1951 H. G. LACKS 2,563,250

AUTOMATIC SEQUENCE TIMING APPARATUS

Filed Jan. 20, 1948 4 Sheets-Sheet 1

INVENTOR.
HAROLD G. LACKS
BY
G. R. Thompson
ATTORNEY.

Aug. 7, 1951 H. G. LACKS 2,563,250

AUTOMATIC SEQUENCE TIMING APPARATUS

Filed Jan. 20, 1948 4 Sheets-Sheet 2

INVENTOR.
HAROLD G. LACKS
BY
G. R. Thompson
ATTORNEY.

INVENTOR.
HAROLD G. LACKS
BY
G. R. Thompson
ATTORNEY.

INVENTOR
HAROLD G. LACKS
BY G. R. Thompson
ATTORNEY

Patented Aug. 7, 1951

2,563,250

UNITED STATES PATENT OFFICE 2,563,250

AUTOMATIC SEQUENCE TIMING APPARATUS

Harold G. Lacks, New York, N. Y.

Application January 20, 1948, Serial No. 3,256

11 Claims. (Cl. 161—1)

This invention relates to automatic apparatus for operating control mechanisms at time sequences, as for instance the control mechanisms of radio receiving sets such as the tuning mechanism and an on and off switch, and provides improvements therein.

It is often desirable to operate automatically the controls of machines, such as those of radio receiving sets, airplanes, and the like, at chosen time intervals, and to provide for such automatic operation well in advance of the time for such operation or sequence of operations. For example, the user of a radio receiver, may desire to select a program which he desires to hear for a morning, afternoon, or evening, and have the radio receiver automatically attuned to the pre-selected stations at the pre-selected times. He may also desire to have the radio receiver shut off automatically for an interval within the pre-selected program period, or at the end of the program period. It may also be desired to actuate other electrically operated devices in sequential steps as to time and manner.

The present invention provides an apparatus for accomplishing the above stated desirable objectives. In one embodiment thereof, it enables the user of a radio receiver to have the tuning device or devices thereof automatically actuated for reception from one or another of a number of transmitting radio stations for a sequence of time intervals, a particular station and a particular time interval at which said particular station is to be tuned in being pre-selected and set up in advance in apparatus for automatically operating the tuning device or devices of the radio receiver. The user may also set the apparatus to automatically shut off the radio receiver for an interval and then have the radio receiver resume operation, or shut off the radio receiver at the end of a program or day.

The invention further provides for flexibility in the use of the apparatus, in enabling a pre-selected sequence of tunings to be changed at or before the selected time for a selected station to be tuned in is reached. The invention further provides a very simple and effective apparatus for accomplishing the above stated purposes.

Three embodiments of the invention are illustrated in the accompanying drawings. The invention may receive other embodiments than those herein specifically illustrated and described and it is to be limited in scope and application only by the appended claims.

In said drawings.

Figure 1:
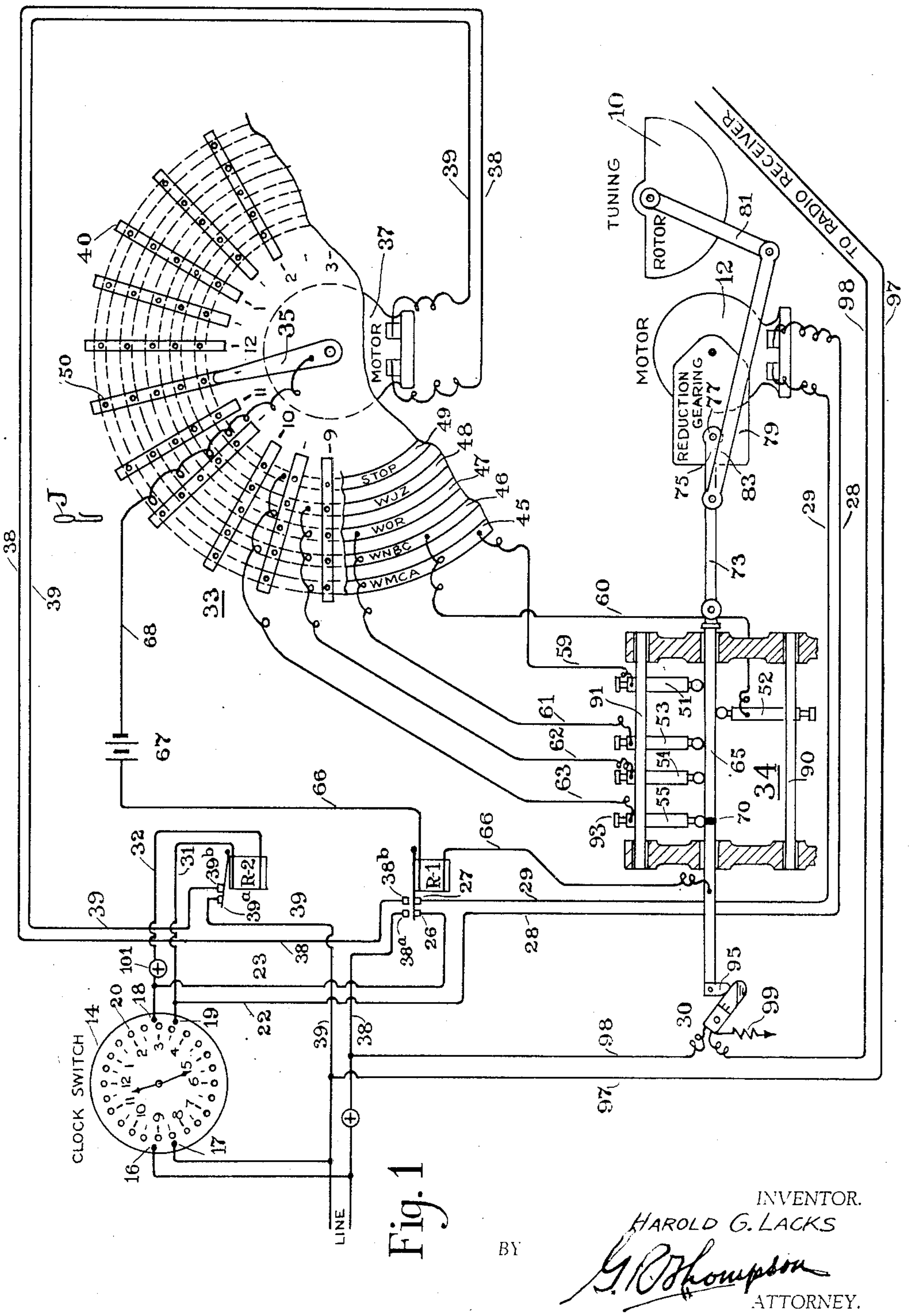
Fig. 1 is a diagrammatic view of an embodiment of the invention associated with a radio receiver.
Figures 3, 4:
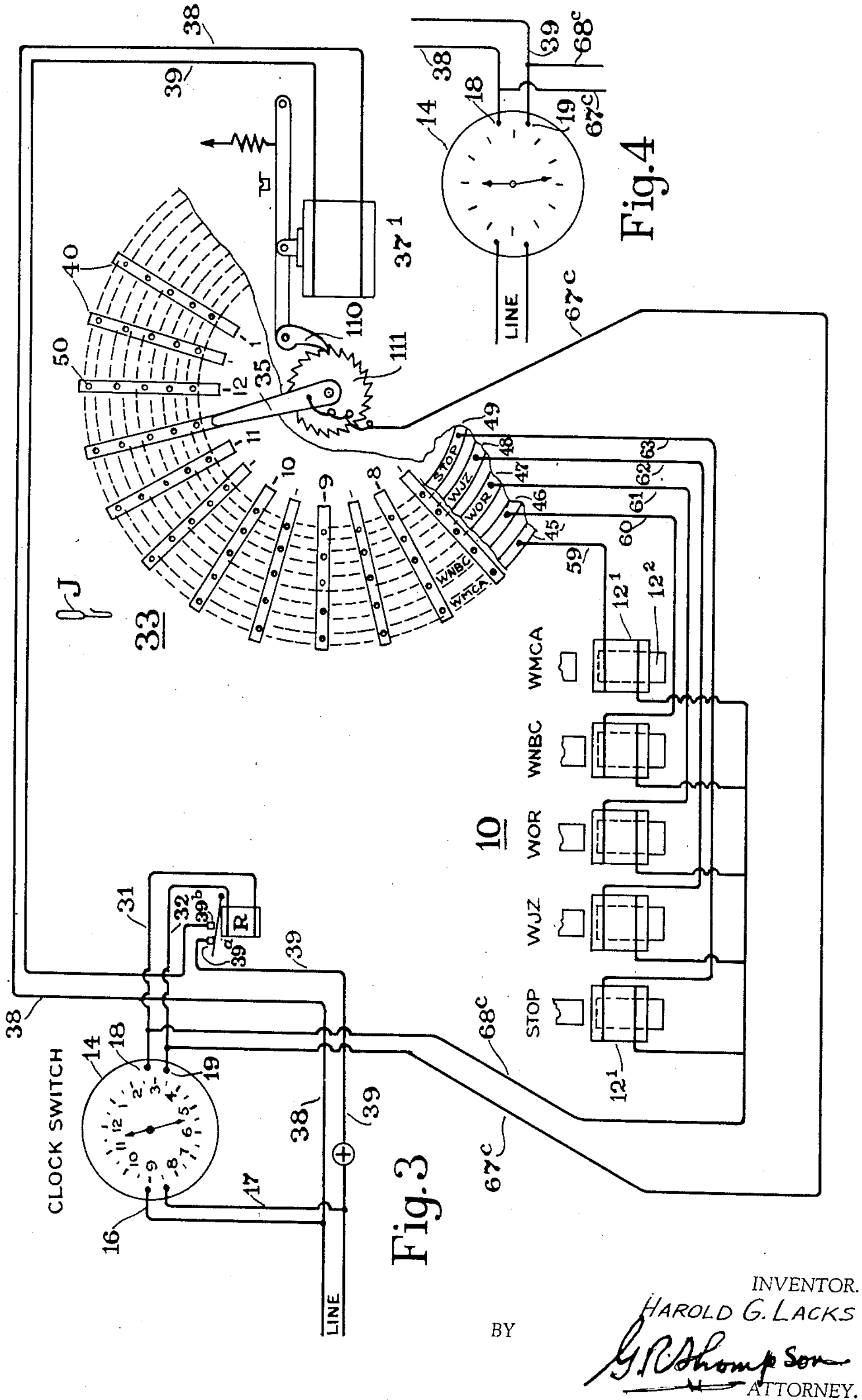
Fig. 4 illustrates a modified form of the embodiment, Fig. 3.

Referring to said drawing, numeral 10 designates a control mechanism or means of an apparatus which is controlled in its operation, as for example, the variable condenser for tuning a radio receiver to reception from different transmitting stations, illustrated in Fig. 1, or the push-button arrangements for tuning such as are in common use in various commercial radio receiving sets, as illustrated in Fig. 3, or in fact, any known mechanism for tuning, whether operating over the entire bands or over only certain locations thereon.

Figure 2:
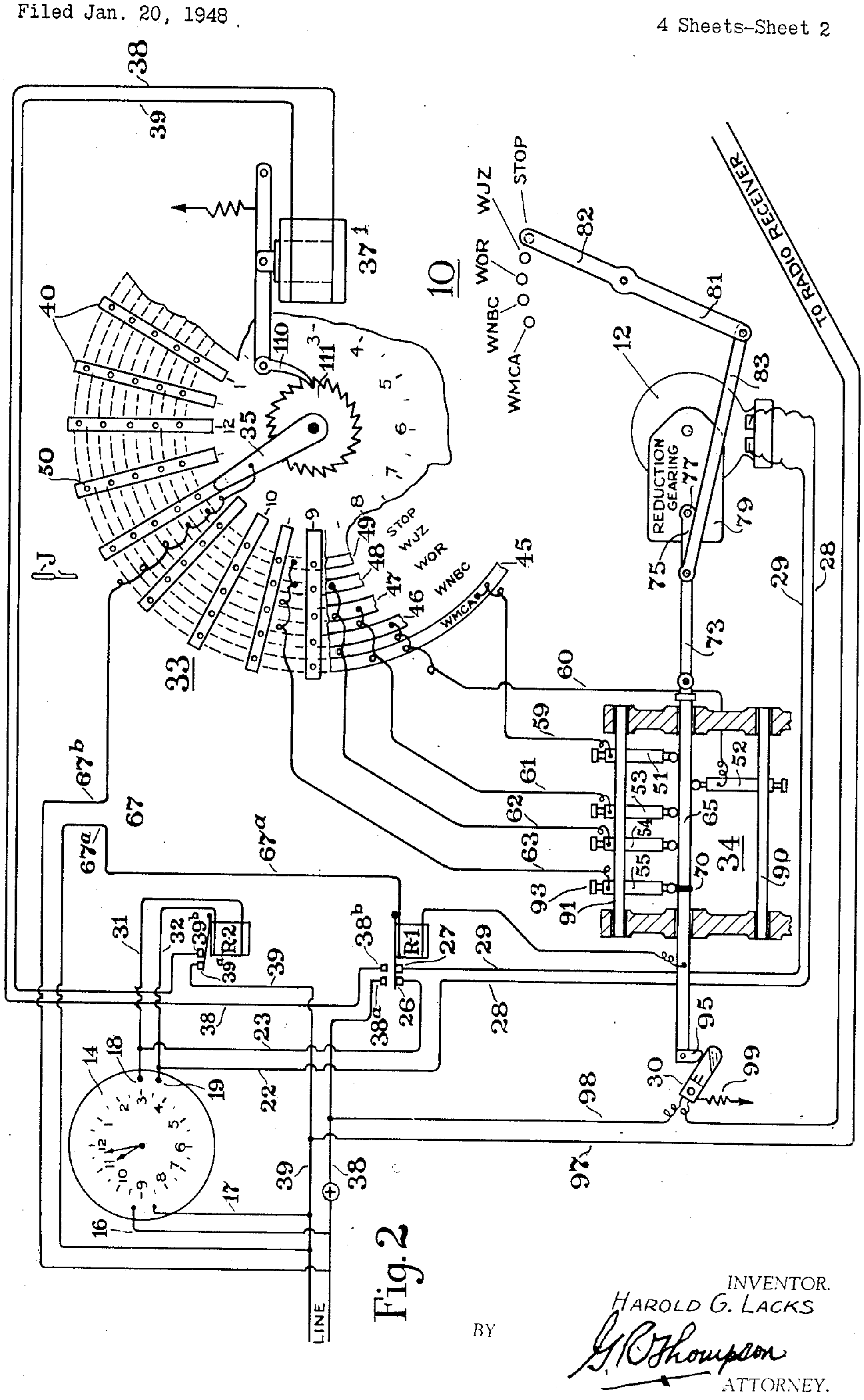
Figs. 2 and 3 are similar views of a second and third embodiment.

The apparatus for automatically operating the control mechanism 10 of the radio receiver as shown in Fig. 1 comprises an electric rotary motor 12 which is automatically operated to move the rotor of the tuning mechanism 10 to various positions at which the radio receiver is attuned to any one of a number of radio transmitting stations. In Fig. 2 a similar motor is shown. In Fig. 3 a reciprocating type of motor $12^1$ in the form of a solenoid with reciprocatory armatures $12^2$ is shown, there being a separate solenoid and reciprocating armature at each point on the band to which it may be desired to adjust the tuning mechanism, four being shown merely for illustrative purposes. The motor 12 is energized by current from a clock-switch 14 which turns current on and off at regular intervals, many forms of which are known. The clock-switch is connected to an electric line at terminals 16 and 17, and current is sent out or cut off at terminals 18, 19. The sending out and cutting off of current at terminals 18 and 19 is controlled by the clock mechanism. In the embodiment of Fig. 1 the clock-switch 14 may be of the type which is equipped with a series of buttons 20 corresponding to time intervals, twenty-four such buttons being shown, one for each one-hour interval for twelve hours. The current is switched on at terminals 18 and 19 at the hour and half-hour and switched off in the interval, ordinarily after one quarter of an hour, though the time when current is switched on and off may be designed as may be preferred. The clock-switch 14 may have a greater number of buttons than that shown for switching current on and off at more frequent intervals than one-half hour, and may be constructed to switch the current off at any desired time after being switched on, within the interval between one switch-on and another. In the embodiments of Figures 1 and 2 conductors 22, 28 lead from terminal 19 to one side of motor 12, conductor 23 leading to a contact 26 spaced from an associated contact 27 of a relay R—1, contact 27 leading via conductor 29 to the other side of the motor 12. It will thus be obvious that this circuit to motor 12 will be completed only when relay R—1 is energized and its armature bridges contacts 26, 27. Conductors 31 and 32 also lead from terminals 18, 19 to the coil of a relay R—2. In the embodiment of Fig. 3, the conductors 31 and 32 lead to the coil of a relay R.

Figure 5:
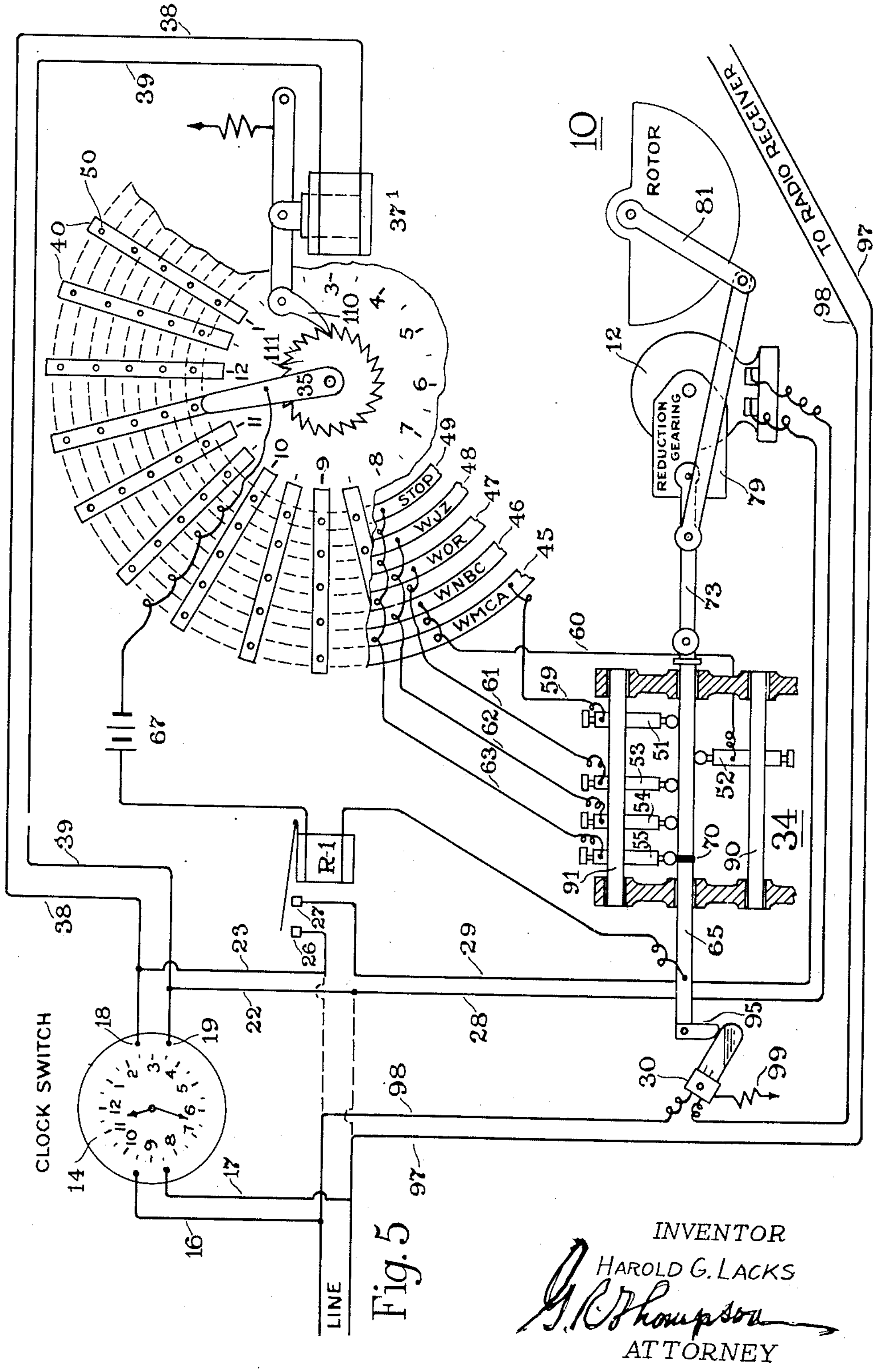
Fig. 5 illustrates a modified embodiment of Fig. 2.

In the embodiments of Figs. 1, 2 and 5, the apparatus for automatically operating the particular control mechanism 10 (and also an on-and-off switch 30 for the radio receiver, to be hereinafter described) also comprises a switchboard 33, a circuit-breaker 34, a current distributor 35, and a motor device 37, Fig. 1, or $37^1$, Fig. 2, for moving the distributor 35 in the interval between the operation of the apparatus to attune the radio receiver to one station and the operation to attune it to another at a later time. The motor 37 or $37^1$ is connected to the power line by conductors 38, 39, the circuit through conductor 38 being interrupted by spaced associated contacts 38*a* and 38*b* at relay R—1, and that through conductor 39 at spaced associated contacts 39*a* and 39*b* at relay R—2. The movements of the distributor 35 are controlled by the relays R—1 and R—2 as will be hereinafter more fully described, it being obvious that the circuit from the power line to the distributor motor 37, 37, through conductors 38, 39 will be completed only when the relays are in open or deenergized condition.

In the embodiment of Fig. 3, the motor $37^1$ is connected to the power line through conductors 38, 39, conductor 39 having spaced associated contacts 39*a* and 39*b* at which the circuit to motor $37^1$ is controlled by a relay R which is energized and de-energized through the conductors 31 and 32 connected to terminals 18, 19 of the clock-switch 14.

The switchboard 33 comprises a series of contacts 40 (hereinafter referred to as "time contacts") arranged in the path of movement of the distributor 35 and contacted thereby in succession, and a plurality of contacts 45, 46, 47, 48, 49 . . . (hereinafter referred to as "control contacts") corresponding in number to the number of radio transmitting stations with which it is desired to automatically attune the radio receiver, plus a contact through which the radio receiver may be switched on and off. The time contacts 40 and the control contacts 45, 46, 47, 48, 49 . . . are arranged in such manner that an electrical connection may be established between a time contact and any one of the plurality of control contacts, and similarly for every other time contact. The electrical connection between a time contact and any selected one of the control contacts may be effected through any suitable connecting means.

A convenient construction of the time contacts and control contacts is in the form of radially arranged time strips crossing (but insulated from) a circular series of control strips, with holes 50 in each time strip corresponding in number to the number of control strips. A plug or jack J may be used for establishing electrical connection between a time contact 40 and any one of the control contacts 45, 46 etc., by inserting it into a hole 50 in a time contact and a corresponding hole in a control contact.

The control contacts 45, 46, 47, 48, 49 . . ., Figs. 1 and 2, are connected to brushes 51, 52, 53, 54, 55 of the circuit breaker 34 by suitable conductors 59, 60, 61, 62, 63. The brushes make contact with a movable bus-bar 65, which is electrically connected with a suitable source of current as a battery 67, Fig. 1, or step-down transformer or the like, or line current through conductors 67*a*, 67*b*, Fig. 2, through the coil of relay R—1 by a conductor 66, Fig. 1 (67*a*, Fig. 2). The distributor 35 is also connected by a conductor 68 with the battery 67, Fig. 1 (67*b*, Fig. 2). In Fig. 3, distributor 35 is connected directly to terminal 19 of clock-switch 14 by a conductor 67*c*.

Bus-bar 65 of the circuit-breaker 34, as shown in Figs. 1, 2 and 5, has a dead spot (insulation) 70 thereon which breaks the circuit at any of the brushes 51 to 55, as hereinafter explained. Bus-bar 65 is moved by motor 12 by any suitable connecting means. One such means is a link 73 connected to a crank 75 on a shaft 77 of a reduction gearing 79 which is driven by the motor 12.

Also connected to the bus-bar 65, Fig. 1, so as to move in synchronism therewith, is the rotor of the variable condenser 10. As shown in Figs. 1 and 3, the rotor has an arm 81 fastened thereto which is connected by a link 83 with the crank 75 to which the bus-bar is connected by the link 73. In Fig. 2 the arm 81 has another arm 82 which contacts the tuning buttons or contacts of the radio receiver.

Brushes 51—55 of the circuit breaker 34 are adjustable longitudinally of the bus-bar 65, whereby they may be set so that the dead spot 70 breaks the circuit to relay R—1 through distributor 35 and conductors 68, 66 and battery 67 and stops motor 12, at the instant that the motor has moved the rotor of condenser 10, Fig. 1 or arm 82, Fig. 2, to a position in which the radio receiver is attuned to any transmitting station corresponding to a brush 51—55 and a control contact 45, 46 etc. in circuit with relay R—1 just prior to the dead spot 70 breaking that circuit. To that end, the brushes 51—55 may be mounted on ways 90, 91 and fastened in position thereon by set screws 93 or other suitable means.

The bus-bar 65 may also be provided with a cam or nose 95 at the free end thereof which coacts with the on-and-off switch 30 for the radio receiving set. Switch 30 may have the form of a mercury switch inserted in one of the leads 97, 98 to the radio receiver from the power line, and when tilted by the cam 95 breaks the circuit to the radio receiver and stops its operation. A spring 99 operates to restore the mercury switch 30 to circuit-closing position, when released by the cam 95.

In the embodiment of Fig. 3, a series of solenoids $12^1$ with reciprocatory armatures $12^2$ are used in place of rotary motor 12, the series of solenoids and armatures constituting motor means, and the relay R—1 for breaking the motor circuit is omitted, as well as the circuit-breaker 34 of Figs. 1 and 2. The solenoid motors $12^1$ correspond in number to the number of controls to be effected, i. e. one for each tuning button of the radio receiver, plus a stop button. The conductors 59—63 lead to the coils of the respective solenoids, i. e. conductor 59 connected to control contact 45 of the switchboard 33 (WMCA), leads to the coil of solenoid $12^1$ which actuates the tuning button for station WMCA, etc. The solenoid motors $12^1$ are individually actuated by current from clock-switch 14, the selection being controlled at the switchboard 33 (distributor 35, time strip 40, and one or another of the control strips 45—49) and the tuning being effected by the clock-switch together with the hook-up through the switchboard 33. Coils of the solenoid motors $12^1$ are connected in multiple with terminal 18 of clock-switch 14 through conductor 68c and distributor 35 is connected with terminal 19 of the clock-switch through conductor 67c.

In the modification shown in Fig. 4, the conductors 38, 39 of the distributor motor are connected directly to the terminals 18, 19 of the clock-switch 14. The relay R in the circuit of motor $37^1$ of Fig. 3 is omitted, the switching on of current by the clock-switch 14 once in each time cycle, actuating the distributor motor, the solenoid merely holding the pawl 110 in its actuated position while current remains on at the clock-switch. Both distributor motor 37 and one or another of the control motors $12^1$ will be actuated by the switching on of current at the clock-switch, and to give the distributor 35 time to move from one time contact 40 to another, before the tuning changes, the control motors $12^1$ may operate with a slightly delayed action.

In the modification shown in Fig. 5, the construction is like that of Fig. 2, except that the relay R—2 for the distributor motor $37^1$ is omitted, distributor motor $37^1$ being connected directly to the terminals 18, 19 of the clock-switch 14 and the switching on of current at the clock-switch once in each time cycle actuating the motor $37^1$ to move the distributor 35 from one time contact 40 to another once in each time cycle. With a rotary motor 12, the relay R—1 is employed with the circuit-breaker 34, to effect the stopping of the motor after a tuning change has been effected. Distributor motor $37^1$ will move distributor to a time contact before motor 12 operates to complete the tuning to the station pre-selected for that time contact. If a reciprocatory type motor such as $12^1$ is employed as a control mechanism motor, then relay R—1 may also be omitted, as illustrated in Fig. 3.

*Operation*

Referring to Fig. 1, assuming that it is a few minutes before 11:30 o'clock and the user wants a program to begin at 11:30 on station WMCA, and to continue on station WOR at 12 o'clock, the operation of the device will be as follows: Pins 20 for 11:30 and 12 o'clock on switch-clock 14 are pulled out, a plug J is inserted in time strip 40 for 11:30 to connect that time strip with control strip 45 for transmitting station WMCA, and another plug J is inserted in time strip 40 for 12:00 to connect that time strip with control strip 47 for station WOR. Distributor 35 is at this time making contact with time strip 40 for 11:30, and, if not, is manually placed there. Clock-switch 14 switches current on to conductors 31, 32 at 11:30. Relay R—2 is immediately energized, breaking the circuit across contacts 39a, 39b at that relay to the motor 37, so that motor remains stationary, leaving distributor 35 in contact with time strip 40 for 11:30. Current from battery 67 is transmitted from distributor 35 to time strip 40 for 11:30, then to control strip 45 by way of the plug switch connection, then to the circuit-breaker 34 and then back to battery 67 through relay R—1. Relay R—1 is energized bridging contacts 26, 27, closing a circuit to motor 12 through conductors 28, 22 and 29, 23 to terminals 19, 18. Motor 12 turns causing bus-bar 65 of the circuit-breaker 34 to move until the dead spot 70 thereon makes contact with brush 51 connected to control strip 45. This breaks the circuit through relay R—1 causing it to break the circuit across contacts 26, 27 to motor 12, and bridges the contacts 38a, 38b. Motor 12 has moved the rotor of condenser 10 at the time the circuit to the motor is broken, to a position where the radio receiver is attuned to transmitting station WMCA, and the rotor of the condenser remains in the position to which it has just been moved for the next half hour, or until the apparatus operates to move it to a position where it attunes the radio receiver to another transmitting station.

In the interval between 11:30 and 12:00 o'clock, clock-switch 14 turns off current from the power lines to terminals 18, 19 and of course to the conductors leading therefrom, and this de-energizes relay R—2 and causes a bridging across contacts 39a, 39b which establishes a circuit thereat to motor 37 through conductor 39, the circuit to motor 37 at relay R—1 across contacts 38a, 38b at this time already being closed by reason of relay R—1 being de-energized. A complete circuit being thus established, causes motor 37 to turn, causing distributor 35 to move to make contact with time strip 40 for 12:00. At time strip 40 for 12:00 distributor 35 finds that time strip connected to control strip 47 for station WOR. A circuit to and from battery 67 is thereupon established through relay R—1 (by way of brush 53 and bus-bar 65 of the circuit-breaker). As soon as the circuit is established through relay R—1 (by the arrival of distributor 35 in contact with time strip 40 for 12:00), energizing it, the circuit to motor 37 is broken, which leaves distributor 35 in contact with said time strip for 12:00, and leaves relay R—1 energized as shown in Fig. 1, bridging the contacts 26, 27 of relay R—1 closing the circuit to motor 12 at the relay, but motor 12 is not actuated because current is cut off at the clock-switch 14. However, at 12:00 the clock-switch 14 turns current on, and the contacts at relay R—1 to motor 12 being closed (as just described), motor 12 will be energized, moving bus-bar 65 until it brings dead spot 70 in contact with brush 53 connected with control strip 47 for station WOR, breaking the circuit through relay R—1 and thereby stopping motor 12. When motor 12 is stopped it has moved the rotor of tuning condenser 10 to a position where the radio receiver is attuned to station WOR, and therefore at 12:00 the radio receiver begins operation on the reception from transmitting station WOR and continues such reception until the apparatus operates to attune the radio receiver to another transmitting station. Distributor 35 is not moved at this time, because, with current turned on at the clock-switch, relay R—2 is energized, breaking the circuit thereat across contacts 39a, 39b via conductor 39 to motor 37.

If it is desired to continue the reception from station WOR at 12:30, the button on clock-switch 14 for 12:30 will be left in, and a button 20 for the next time period when reception from another transmitting station is desired (say 1:00) is pulled out and a plug J inserted in the time strip of the switchboard corresponding to that period. When current is switched off at the clock switch between 12:00 and 12:30 motor 37 will be operated to move distributor 35 to the time strip for 1:00, but thereafter the circuit to motor 37 will be held open at relay R—1 until 1:00 following the operation of motor 12 to adjust variable condenser 10 for reception from the station selected for 1:00.

If now it had been desired to obtain reception from station WJZ at 1:00, a plug J (at the original setting up on the switchboard, or before 1:00) would have been inserted in the time strip for 1:00 connecting that time strip with control strip 48 for station WJZ. When clock-switch 14 turned the current off at the interval determined by the clock-switch, say, at 12:15, a circuit will then be established at relay R—2 to motor 37, the circuit at relay R—1 already having been closed, and motor 37 will turn distributor 35. The motor 37 will continue to turn distributor 35 past the time contact 40 for 12:30 until the distributor contacts the time contact 40 for 1:00. At the 12:30 position there was no connection between the 12:30 time strip 40 and a control strip, so relay R—1 was not energized to break the circuit to motor 37. But, at the 1:00 position, time strip 40 for 1:00 had been connected to control strip 48 for station WJZ, and when motor 37 turned distributor 35 to make contact with the time strip for 1:00 a circuit was established through relay R—1, energizing relay R—1 and thereby causing it to break the circuit to motor 37 and leaving distributor 35 in contact with the time strip 40 for 1:00. At 1:00 current will be switched on by clock-switch 14, and the circuit to motor 12 being at this time held closed by the relay R—1, current will flow to motor 12, operating it, bus-bar 65, and rotor of tuning condenser 10 until the circuit to relay R—1 is broken at the circuit-breaker 34, thereby de-energizing relay R—1 and relay R—1 in turn breaking the circuit to motor 12, leaving the radio receiver at 1:00 attuned to station WJZ, as previously selected on the switchboard set-up.

From the foregoing description it will be readily perceived how radio reception from different radio transmitting stations at different times may be pre-selected and the apparatus set up to attune the radio receiver to such pre-selected transmitting stations by inserting plugs in the switchboard 33 to make connection between appropriate time strips 40 and appropriate control strips 45, 56, etc., and by pulling out and leaving in appropriate buttons 20 on the clock-switch 14.

Assuming it is desired to stop the operation of the radio receiver at 12:30, for example, a plug J is inserted in a hole in time strip 40 for 12:30 o'clock and the button 20 for 12:30 on clock-switch 14 is pulled out. Some time after 12:00 o'clock, clock-switch 14 has cut off current at terminals 18 and 19, at which time a circuit is completed to motor 37 through the action of relays R—1 and R—2, causing the motor 37 to move distributor 35 from the time-strip 40 for 12:00 to the time strip for 12:30. When distributor 35 makes contact with the time strip for 12:30, a circuit from battery 67 is completed from the time strip for 12:30 to stop-strip 49, and thence through brush 93, bus-bar 65 and the coil of relay R—1. Relay R—1 breaks the circuit to motor 37 at contacts 38*a*, 38*b* and motor 37 stops with the distributor 35 remaining in contact with the time strip for 12:30. Until 12:30, the circuit to motor 12 is broken at clock-switch 14. At 12:30 clock-switch 14 switches on current to motor 12, the circuit at this time being closed at contacts 26, 27 of relay R—1. Motor 12 then operates moving bus-bar 65 of circuit-breaker 34 until cam 95 moves switch 30 to break the circuit to the radio receiver and the dead spot 70 contacts brush 55 connected with the strip 49 of the switchboard and breaks the circuit to the coil of relay R—1, whereupon the relay acts to break the circuit at contacts 26, 27 to motor 12 and stop the motor. The operation of the radio receiver is then stopped. A plug J should also be inserted in the switch board to connect the time strip for 1:00 (or some later time strip) to any one of the control strips 45—48, so that when clock-switch 14 shuts off the current at terminals 18, 19, between 12:30 and 1:00, starting motor 37, there will be means for stopping motor 37, which, it will be remembered, is effected at contacts 38*a*, 38*b* of relay R—1. The button 20 of clock-switch 14 for 1:00 o'clock (or for such other later hour corresponding to time strip 40 at which the distributor 35 is to be stopped) should be pulled out at the same time a plug J is inserted to connect the time strip involved to a control strip 45, 46, etc.

Referring to Fig. 2, wherein the clock-switch 14 switches current on and off at regular intervals, being without buttons 20, a solenoid motor $37^1$ is used in place of rotary motor 37, no break is required in the conductor 38 leading to motor $37^1$ and the individual station tuning means is actuated by motor 12 and arms 81 and 82 connected thereto. The operation is much the same as that of the Fig. 1 embodiment.

With distributor 35 on time contact for 11 o'clock, and plugged in to control strip 45 (WMCA) the relay R—1 is energized closing the circuit to motor 12 at contacts 26, 27, as shown in Fig. 2 but the circuit is open at clock-switch 14. The circuit to motor $37^1$ is broken by relay R—1 at contacts 38*a*, 38*b*. At 11 o'clock, the clock-switch 14 switches current on at terminals 18, 19, energizing relay R—2 to attract its armature which breaks the circuit to motor $37^1$ at relay R—2. The circuit to motor 12 being closed at relay R—1, motor 12 will be energized, moving bus-bar 65 until dead spot 70 contacts brush 51, breaking the circuit through the coil of relay R—1 and the relay R—1 in turn breaking the circuit to motor 12. Motor 12 is stopped in a position at which arm 82 has been moved to contact button WMCA, thereby tuning in station WMCA.

When clock-switch 14 switches current off in the interval between 11 o'clock and 11:30, relay R—2 is de-energized, thereby closing the circuit to motor $37^1$ at contacts 39*a*, 39*b*. The circuit to motor $37^1$ is already closed at relay R—1 or conductor 38 may run to motor $37^1$ without a break at relay R—1. Motor $37^1$ is energized, its armature pulled in and pawl 110 advances ratchet wheel 111 one step to move distributor 35 from the 11:00 o'clock time strip 40 to the 11:30 time strip, and until clock-switch 14 again switches on current at 11:30, a waiting circuit is set up to motor 12 through the 11:30 time contact and whatever control contact 45 to 49 that may be connected thereto. Motor $37^1$ remains potentially energized until clock-switch 14 switches current on at 11:30, but inasmuch as it has only a one-step movement it does not, while thus energized, act to advance distributor 35. The next one-step advance of distributor 35 occurs when current is again switched off by clock-switch 14 in the interval between 11:30 and 12:00. If it is desired to continue reception at 11:30 from WMCA control contact 45 should be connected to the 11:30 time strip. If reception from another station (WJZ for example) is desired at 11:30, the change is effected by a connection previously established between the 11:30 time contact and control contact 48.

Referring to the embodiment of Fig. 3, the desired sequence of radio receptions is set up on switchboard 33, just as in the other embodiments, i. e. by establishing electrical connections between successive time contacts and selected control contacts 45—49. Motor $37^1$ operates to advance distributor 35 one step in each time cycle, but only one relay R is used. Relay R operates to break the circuit to motor $37^1$ at contacts 39*a*, 39*b* when current is switched on at clock-switch 14 and to close the circuit thereto when current is switched off at the clock-switch, advancing distributor 35 to the next time contact 40 ahead of the time when a circuit is established to one of the individual solenoid motors $12^1$ to actuate a tuning control button.

With distributor 35 on time contact for 11:30 o'clock, and connection established between that time contact and a control contact, say WMCA, at 11:30 clock-switch 14 switches current on. The circuit to motor $37^1$ is broken at relay R. Also a circuit is established through the coil of solenoid motor $12^1$ for WMCA by way of conductor 67*c*, distributor 35, time strip for 11:30, control strip 45, conductor 59, and return conductor 68*c*. Each of the solenoid motors $12^1$ has a one-step movement and will remain energized until clock-switch 14 switches current off in the time cycle between 11:30 and 12:00 o'clock. Between 11:30 and 12:00 clock-switch 14 switches current off, closing the circuit to motor $37^1$ at relay R through contacts 39*a*, 39*b*. Motor 37 advances distributor 35 one step to the 12:00 time contact. If the 12:00 time strip is connected to say the control strip 48 for WJZ, at 12:00, when the clock-switch 14 switches current on, the solenoid motor $12^1$ for WJZ will actuate the tuning button of the radio receiver for WJZ and the WJZ button will push out the WMCA button through the usual interconnecting mechanism of the radio receiver.

The construction whereby the distributor 35 is moved from contact with a time strip through which the radio receiver is attuned to a transmitting station (say the 12:30 time strip 40), to another time strip 40 (say the 1:00 time strip), through which the radio receiver is to be attuned later to another radio transmitting station (or stopped), has advantages. Arcing, between the distributor 35 and the time strips 40 is avoided, and a sharp and punctual operation of the motor 12 or $12^1$ to change the tuning at the predetermined time is effected.

What is claimed is:

1. An automatic apparatus for operating control mechanisms at time sequences, comprising a control means, means for selectively actuating said control means comprising a distributor, time contacts successively contacted by said distributor, a plurality of control contacts and means for connecting each time contact with any one of said control contacts, motive means for actuating said control means, and a circuit to said motive means comprising said distributor, a time contact contacted by said distributor and a control contact connected to said time contact, a motor for advancing said distributor from one time contact to another, a clock-switch for switching current on and off, means, when said clock-switch switches on current, completing a circuit to the control mechanism motor through a time contact and connected control contact with which said distributor makes contact, and means, when said clock-switch switches off current preceding said switching on of current, completing a circuit to said distributor motor to energize said motor to advance said distributor to make contact with a time contact so that said distributor is advanced to a time contact through which a circuit to said motive means is completed, in advance of the completion of such circuit.

2. An automatic apparatus for operating control mechanisms at time sequences, according to claim 1, wherein said control mechanism motive means is a rotary motor, and further comprising a circuit breaker and a relay in the circuit which includes the distributor, a time contact and a control contact, said circuit-breaker having a part driven by said control mechanism motor for breaking the circuit through said relay at different positions of the driven part according to the control contact in circuit, and thereby actuating said relay to break the circuit to said control mechanism motor.

3. An automatic apparatus for operating control mechanisms at time sequences, according to claim 1, wherein said distributor motor is a rotary motor, and further comprising a relay in the circuit which includes said distributor, a time contact and a control contact for making and breaking the circuit to said distributor motor, and a second relay in circuit with said clock-switch acting to break the circuit to said distributor motor when current is switched off by said clock-switch and to break the circuit to said distributor motor when current is switched off by said clock-switch.

4. An automatic apparatus for operating control mechanisms at time sequences, according to claim 1, wherein said control mechanism motive means comprises a separate reciprocatory motor for each control contact.

5. An automatic apparatus for operating control mechanisms at time sequences, according to claim 1, wherein said distributor motor is a reciprocatory motor having a one-step operation at each energization.

6. An automatic apparatus for operating control mechanisms at time sequences, comprising a control mechanism, an electric motor for actuating said control mechanism, a switchboard, a circuit-breaker, a distributor, an electric motor for advancing said distributor, a clock-switch for switching current on and off, and relays R—1 and R—2, said switchboard having successive time contacts and a plurality of control contacts and means for connecting any time contact with any control contact, said circuit-breaker comprising a plurality of brushes each of which is connected to a control contact, and a bus-bar having a dead spot thereon, said distributor successively contacting said time contacts and completing a circuit to the coil of relay R—1 through a contacted time contact, a control contact connected to said time contact, a brush connected to said control contact, and said bus-bar, said relay R—1 operating to open and close a circuit to said control mechanism motor, and also a circuit to said distributor motor, said clock-switch also controlling the flow of current to said control mechanism motor, and to relay R—2; said relay R—2, together with relay R—1, operating to open and close a circuit to said distributor motor, said clock-switch, when current is switched on, energizing said control mechanism motor when the circuit to said motor is closed at relay R—1, and opening the circuit to the distributor motor at relay R—2, said relay R—1 operating to close the circuit to said control mechanism motor through the distributor, time contact contacted thereby, control contact connected to said time contact, a related brush and the bus-bar of the circuit-breaker and the coil of relay R—1, said control mechanism motor moving said bus-bar and control mechanism and said bus-car breaking the circuit to said motor when the dead spot thereon contacts the brush in circuit and the control mechanism has been moved to a position predetermined by the control contact in circuit, said relay R—1, when the circuit is broken at said circuit-breaker closing the circuit to the distributor motor; said clock-switch, when current is switched off, completing a circuit to the distributor motor and the distributor motor operating to move the distributor to the next time contact through which a circuit to the coil of relay R—1 through the switchboard and circuit-breaker may be completed, which circuit, when completed, energizes relay R—1 to break the circuit to said distributor motor, relay R—1 remaining energized to close the circuit thereat to the control mechanism motor until said clock-switch again switches current on to energize the control mechanism motor to bring the control mechanism to another control position and then break the circuit to said motor and relay R—1 at said circuit-breaker.

7. An automatic apparatus for operating control mechanisms at time sequences, comprising a control mechanism, an electric motor for actuating said control mechanism, a switchboard, a circuit-breaker, a distributor, an electric motor having a one-step operation for advancing said distributor one step at each energization, a clock-switch for switching current on and off, and relays R—1 and R—2, said switchboard having successive time contacts and a plurality of control contacts and means for connecting any time contact with any control contact, said circuit-breaker comprising a plurality of brushes each of which is connected to a control contact, and a bus-bar having a dead spot thereon, said distributor successively contacting said time contacts and completing a circuit to the coil of relay R—1 through a contacted time contact, a control contact connected to said time contact, a brush connected to said control contact, and said bus-bar; said relay R—1 operating to open and close a circuit to said control mechanism motor; said clock-switch also controlling the flow of current to said control mechanism motor and to relay R—2, said relay R—2 operating to open and close a circuit to said distributor motor, said clock-switch, when current is switched on, energizing said control mechanism motor when the circuit to said motor is closed at relay R—1, said relay R—1 operating to close the circuit to said control mechanism motor through the distibutor, time contact contacted thereby, control contact connected to said time contact, a related brush and the bus-bar of the circuit-breaker and the coil of relay R—1, said control mechanism motor moving said bus-bar and control mechanism and said bus-bar breaking the circuit to said motor when the dead spot thereon contacts the brush in circuit and the control mechanism has been moved to a position predetermined by the control contact in circuit, said clock-switch, when current is switched off, completing a circuit to the distributor motor and the distributor motor operating to move the distributor one step to the next time contact.

8. An automatic apparatus for operating control mechanisms at time sequences, comprising a control mechanism including a plurality of reciprocatory motors each having a one-step operation at each energization, a switchboard, a distributor, an electric motor having a one-step operation for advancing said distributor one step at each energization, a clock-switch for switching current on and off; said switchboard having successive time contacts and a plurality of control contacts and means for connecting any time contact with any control contact, an electrical connection between each control contact and a control mechanism motor, said clock-switch controlling the flow of current to said control mechanism motors, said clock-switch, when current is switched on, energizing a control mechanism which is in circuit with said distributor, a time contact and a control contact connected to said time contact, and also closing the circuit to said distributor motor, and a relay controlling the circuit to said distributor motor arranged to close a circuit to said distributor motor when said clock-switch switches current off.

9. An automatic apparatus for operating control mechanisms at time sequences, according to claim 1, wherein a part of said control means is an on and off switch.

10. An automatic apparatus for operating control mechanism at time sequences, comprising control means, a switchboard comprising time contacts, control contacts, means for electrically connecting a time contact with a control contact and a distributor, a motor for moving the distributor from one time contact to another in the interval between one operation and another of the control means, a motor for actuating said control means, and a clock-switch closing a circuit at successive time intervals to said motor for actuating said control means, through a time contact, onto which said distributor has been moved in the interval between successive operations of said control means, and a control contact electrically connected to said time contact, to actuate said motor for actuating said control means to effect predetermined controls at predetermined time intervals.

11. An automatic apparatus according to claim 10, wherein said clock-switch switches current on and then switches current off for a part of each time interval, means operated by the switching off of current at said clock-switch to actuate said distributor motor.

HAROLD G. LACKS.

REFERENCES CITED

The following references are of record in the file of this patent:

UNITED STATES PATENTS

| Number | Name | Date |
|---|---|---|
| 1,975,781 | Flehr | Oct. 9, 1934 |
| 1,992,327 | Powell | Feb. 26, 1935 |
| 2,034,254 | Stenerson | Mar. 17, 1936 |
| 2,165,483 | Huggins | July 11, 1939 |
| 2,186,964 | Foster | Jan. 16, 1940 |
| 2,190,699 | Cole | Feb. 20, 1940 |
| 2,221,544 | Johnson | Nov. 12, 1940 |
| 2,238,894 | Foster | Apr. 22, 1941 |
| 2,248,116 | Peters | July 8, 1941 |